J. L. & D. H. COLES.

Feeding Mechanism for Sewing-Machines.

No. 5,177. Reissued Dec. 10, 1872.

Witnesses
Chas. Wahlers
Ernst Bilhuber

Inventors.
John L. Coles
David H. Coles
Van Santvoord & Sharp

AM. PHOTO-LITHOGRAPHIC CO. N.Y. (OSBORNE'S PROCESS.)

UNITED STATES PATENT OFFICE.

JOHN L. COLES AND DAVID H. COLES, OF NEW YORK, N. Y., ASSIGNORS, BY MESNE ASSIGNMENTS, OF PART INTEREST TO S. W. JOHNSON, SPENCER H. SMITH, NORMAN CAMPBELL, A. G. DARWIN, AND CARL JUSSEN.

IMPROVEMENT IN FEEDING MECHANISMS FOR SEWING-MACHINES.

Specification forming part of Letters Patent No. 83,133, dated October 20, 1868; reissue No. 5,177, dated December 10, 1872.

DIVISION A.

*To all whom it may concern:*

Be it known that we, JOHN L. COLES and DAVID H. COLES, both of the city, county, and State of New York, have invented a new and useful Improvement in Sewing-Machine Feed; and we do hereby declare the following to be a full, clear, and exact description thereof, which will enable those skilled in the art to make and use the same, reference being had to the accompanying drawing forming part of this specification, in which drawing—

Figure 1:
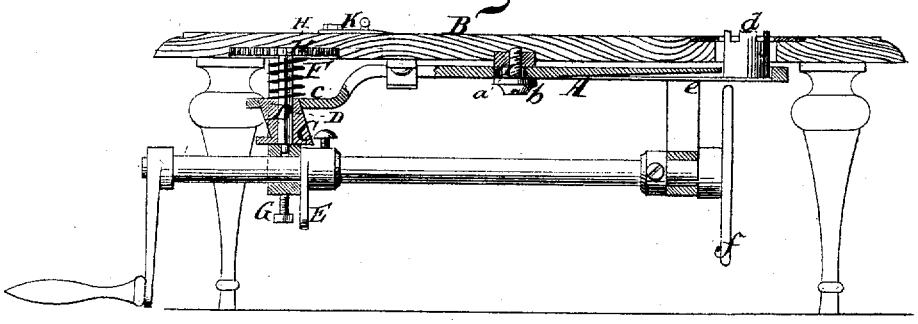
Figure 2:
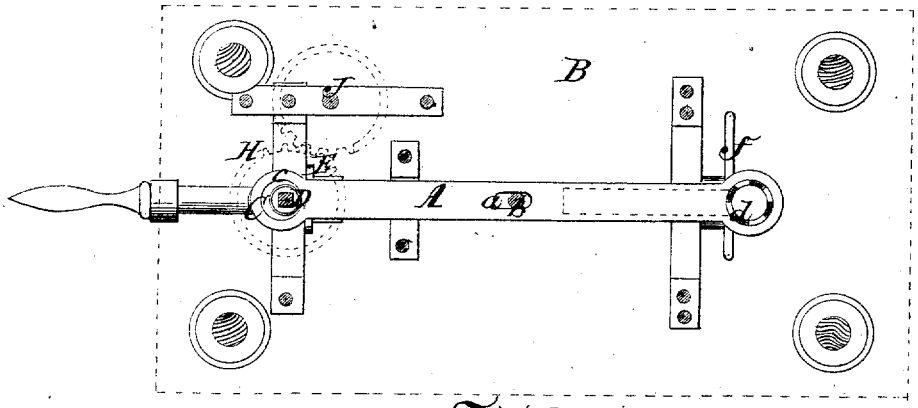
Figure 3:
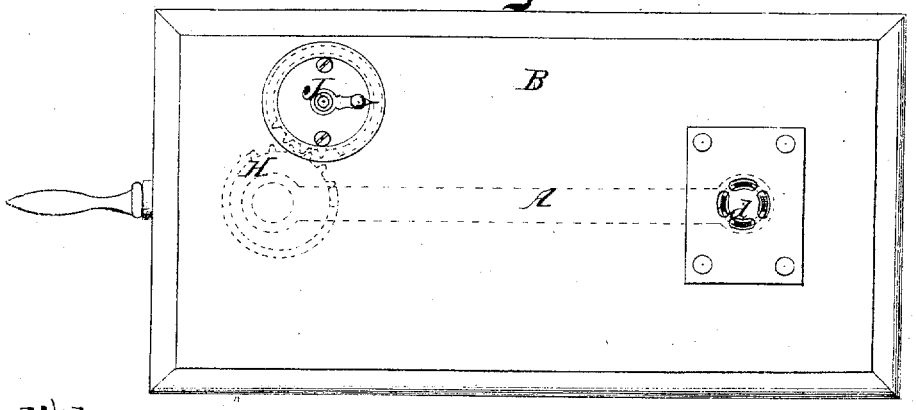

Figure 1 represents a sectional side elevation of this invention; Fig. 2 is a horizontal section thereof; and Fig. 3 is a plan or top view of the same.

Similar letters indicate corresponding parts.

This invention relates to a universal feed for sewing-machines which depends upon the action of a cam-slide, and which is constructed in such a manner that by turning said cam-slide the feed can be made to act in any direction of the compass, and by adjusting the throw or stroke of the cam-slide the length of the stitch can be regulated. The teeth of the feed-dog are arranged in a circle surrounding the needle-throat.

In the drawing, the letter A designates the feed-bar, which is provided with a slot, *a*, through which passes a screw, *b*, which secures the same to the under surface of the cloth-plate B. The rear end of the feed-bar forms a ring or eye, *c*, which embraces the cam-slide C. This cam-slide consists of a cylinder placed in an oblique position on the rod D, and it is subjected to the action of a cam, E, and of a spring, F, which spring has a tendency to press the cam-slide toward the face of the cam. By the combined action of the cam and spring the cam-slide receives a reciprocating motion through the eye of the feed-bar, compelling said feed-bar to assume a reciprocating or oscillating motion corresponding to the obliquity of the cam-slide. By a screw, G, the cam-slide can be set closer to or further from the cam E, and thereby the stroke of said cam-slide, and consequently the length of the stitch, is changed. On the rod D, which forms the guide for the cam-slide, is mounted a gear-wheel, H, which gears into a cog-wheel, I, mounted on an arbor, J, which projects up through the cloth-plate B, and to the upper end of which is secured an index-hand, K, which sweeps over a dial-plate inserted into or marked on the cloth-plate. By turning this index-hand the rod D and the cam-slide are turned and the direction of the feed is changed, the index being adjusted in such a manner that it indicates the direction in which the feed takes place. The teeth *d* of the feed-bar, which forms the feed-dog, are secured to a spring, *e*, which is secured to the under surface of said feed-bar, and which is exposed to the action of a cam or eccentric, *f*, so that the teeth are caused to project through suitable openings in the cloth-plate or throat-plate. Said teeth are arranged in a circle surrounding the needle-throat, and they are so formed that they feed the fabric in any desired direction, the openings in the throat-plate through which they project being made of such a size that they (the teeth) can move the required distance in every direction.

By this arrangement a sewing-machine feed is obtained which can be properly termed a universal feed, since it is capable of feeding in every direction of the compass.

We are aware that reversible feeds, and also feeds capable of acting in four different directions, have heretofore been constructed; but our feed is superior to these, since it acts in every desirable direction. We are also aware of the well-known four-motion feed in general use in many sewing-machines. These devices we do not claim.

What we claim as new, and desire to secure by Letters Patent, is—

The cam-slide C, in combination with the feed-bar A having a cam-supported feeding-surface, substantially as and for the purpose described.

J. L. COLES.
DAVID H. COLES.

Witnesses:
W. HAUFF,
E. F. KASTENHUBER.